US011060775B2

(12) United States Patent
Delgoshaei

(10) Patent No.: US 11,060,775 B2
(45) Date of Patent: Jul. 13, 2021

(54) METHOD AND APPARATUS FOR REFRIGERANT LEAK DETECTION

(71) Applicant: Lennox Industries Inc., Richardson, TX (US)

(72) Inventor: Payam Delgoshaei, Addison, TX (US)

(73) Assignee: Lennox Industries Inc., Richardson, TX (US)

( * ) Notice: Subject to any disclaimer, the term of this patent is extended or adjusted under 35 U.S.C. 154(b) by 292 days.

(21) Appl. No.: 15/453,952

(22) Filed: Mar. 9, 2017

(65) Prior Publication Data

US 2018/0259235 A1 Sep. 13, 2018

(51) Int. Cl.
*F25B 49/02* (2006.01)
*F24F 11/83* (2018.01)
*F24F 11/36* (2018.01)

(52) U.S. Cl.
CPC ............. *F25B 49/02* (2013.01); *F24F 11/83* (2018.01); *F24F 11/36* (2018.01); *F25B 2500/222* (2013.01)

(58) Field of Classification Search
CPC ...... F25B 49/02; F25B 49/00; F25B 2500/22; F25B 2500/222; F24F 11/36
See application file for complete search history.

(56) References Cited

U.S. PATENT DOCUMENTS

| 5,351,037 | A  | * | 9/1994 | Martell | ............... | G01M 3/16 324/455 |
|---|---|---|---|---|---|---|
| 6,772,598 | B1 |  | 8/2004 | Rinehart |  |  |
| 10,113,783 | B2 | * | 10/2018 | Takagi | ............... | F25B 1/04 |
| 2002/0178738 | A1 | * | 12/2002 | Taira | ............... | F25B 49/005 62/129 |
| 2004/0016241 | A1 | * | 1/2004 | Street | ............... | F25B 49/022 62/129 |
| 2004/0239498 | A1 |  | 12/2004 | Miller |  |  |
| 2008/0060367 | A1 | * | 3/2008 | Zima | ............... | B60H 1/00428 62/149 |
| 2010/0315247 | A1 |  | 12/2010 | Tseng |  |  |
| 2011/0113802 | A1 |  | 5/2011 | Wakamoto et al. |  |  |
| 2013/0213068 | A1 | * | 8/2013 | Goel | ............... | F25B 49/005 62/129 |

(Continued)

FOREIGN PATENT DOCUMENTS

| CN | 209181072 U |  | 7/2019 |  |  |
|---|---|---|---|---|---|
| EP | 0719995 A2 | * | 7/1996 | ............. | C04B 41/52 |

(Continued)

OTHER PUBLICATIONS

JPH07159010 Translation (Year: 2003).*
U.S. Appl. No. 16/700,104, filed Dec. 2, 2019, 26 pages.

*Primary Examiner* — Brian M King
(74) *Attorney, Agent, or Firm* — Shackelford, Bowen, McKinley & Norton, LLP

(57) ABSTRACT

A method of monitoring a heating, ventilation, and air conditioning (HVAC) system for refrigerant leak. The method includes monitoring, by a controller, operation of the HVAC system and determining, using a plurality of leak detectors, whether refrigerant within the HVAC system is leaking. Responsive to a positive determination in the determining step, receiving, by the controller, a refrigerant leak warning signal and modifying, by the controller, operation of the HVAC system to prevent the refrigerant from entering an enclosed space.

17 Claims, 3 Drawing Sheets

(56) References Cited

U.S. PATENT DOCUMENTS

| | | |
|---|---|---|
| 2016/0178229 A1 | 6/2016 | Chen et al. |
| 2017/0284718 A1 | 10/2017 | Suzuki et al. |
| 2018/0259235 A1 | 9/2018 | Delgoshaei |
| 2018/0283718 A1 | 10/2018 | Honda et al. |
| 2019/0017722 A1 | 1/2019 | Suzuki et al. |
| 2019/0390877 A1* | 12/2019 | Sakae .................. F25B 1/00 |

FOREIGN PATENT DOCUMENTS

| | | | |
|---|---|---|---|
| EP | 0936417 A2 | 8/1999 | |
| EP | 1083392 A2 | 3/2001 | |
| EP | 1083392 A3 | 10/2002 | |
| EP | 1473524 A2 | 11/2004 | |
| EP | 2816295 A2 | 12/2014 | |
| EP | 2955454 A2 | 12/2015 | |
| JP | H07159010 | * 6/1995 | ............ F24F 11/02 |
| JP | H07159010 A | 6/1995 | |
| JP | 2017-053509 A | 3/2017 | |
| JP | 2019-113258 A | 7/2019 | |
| WO | WO-2013/038704 A1 | 3/2013 | |
| WO | WO-2018154652 A1 | 8/2018 | |
| WO | WO-2018220810 A1 | 12/2018 | |

\* cited by examiner

METHOD AND APPARATUS FOR REFRIGERANT LEAK DETECTION

TECHNICAL FIELD

The present invention relates generally to heating, ventilation, and air conditioning (HVAC) systems and, more particularly, but not by way of limitation, to a method of and system for detecting refrigerant leak and modifying operation of the HVAC system to prevent refrigerant from entering an enclosed space.

HISTORY OF RELATED ART

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air).

SUMMARY

A method of monitoring a heating, ventilation, and air conditioning (HVAC) system for refrigerant leak. The method includes monitoring, by a controller, operation of the HVAC system and determining, using a plurality of leak detectors, whether refrigerant within the HVAC system is leaking. Responsive to a positive determination in the determining step, receiving, by the controller, a refrigerant leak warning signal and modifying, by the controller, operation of the HVAC system to prevent the refrigerant from entering an enclosed space.

A heating, ventilation, and air conditioning (HVAC) system. This system includes a plurality of leak detectors associated with at least one component of the HVAC system and a controller configured to communicate with the plurality of leak detectors. The plurality of leak detectors are configured to determine whether refrigerant within the HVAC system is leaking, responsive to a positive determination, forward to the controller, a refrigerant leak warning signal and upon receiving the refrigerant leak warning signal, the controller modifies operation of the HVAC system to prevent the refrigerant from entering an enclosed space.

A method of monitoring a heating, ventilation, and air conditioning (HVAC) system for refrigerant leak. The method includes monitoring, by a controller, operation of the HVAC system, determining, using a plurality of leak detectors, whether refrigerant within the HVAC system is leaking, responsive to a positive determination in the determining step, receiving, by the controller, a refrigerant leak warning signal and modifying, by the controller, operation of the HVAC system to prevent the refrigerant from entering an enclosed space. The modifying includes suspending operation of an air blower, activating an exhaust fan, regulating economizer dampers to be in an open configuration and regulating return and supply air dampers to be in a closed configuration

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION

Figure 1:
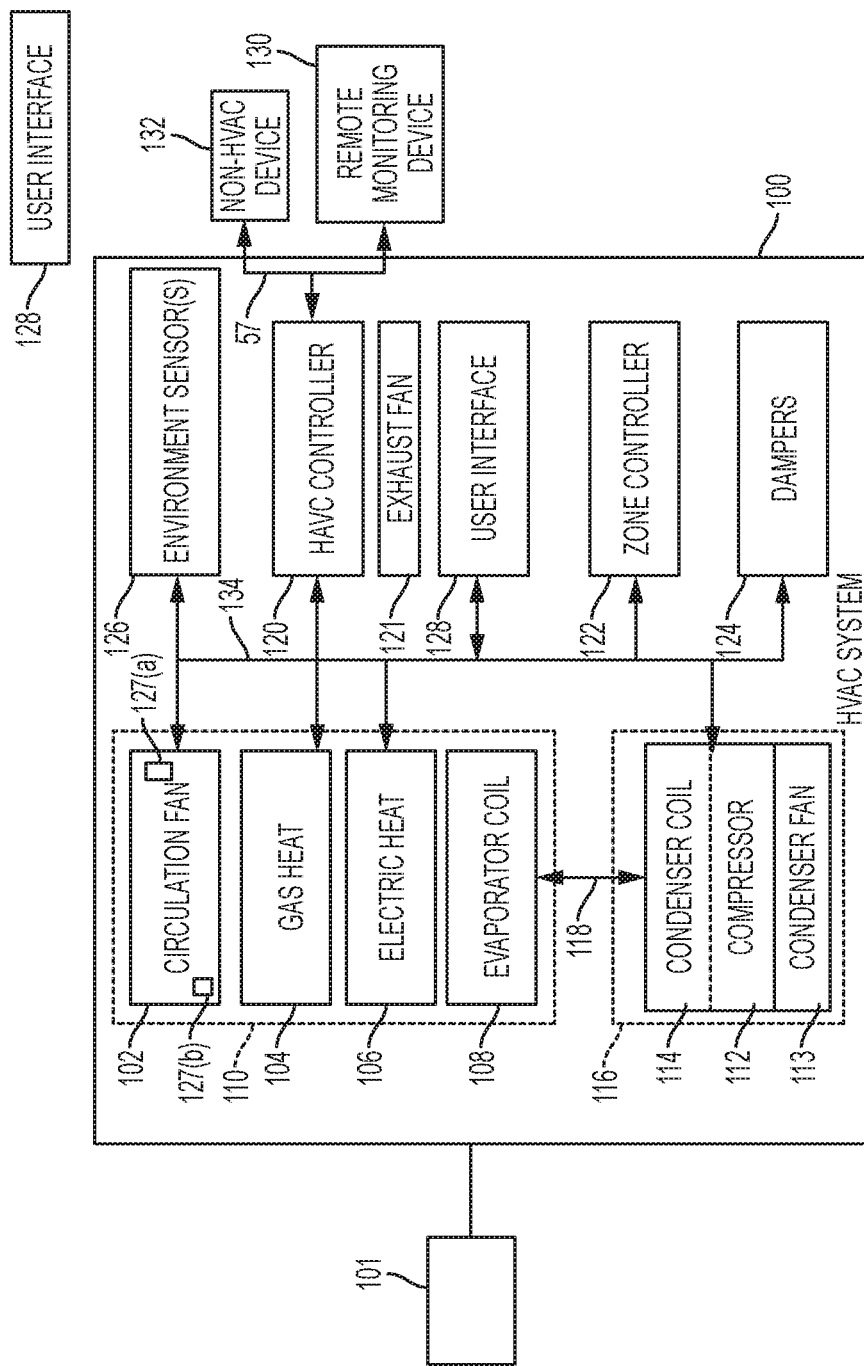
FIG. 1 is a block diagram of an illustrative HVAC system.

FIG. 1 illustrates an HVAC system 100. In a typical embodiment, the HVAC system 100 is a networked HVAC system configured to condition air via, for example, heating, cooling, humidifying, or dehumidifying. The HVAC system 100 can be a residential system or a commercial system such as, for example, a roof top system. For illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 102, a gas heat 104, electric heat 106 typically associated with the variable-speed circulation fan 102, and a refrigerant evaporator coil 108, also typically associated with the variable-speed circulation fan 102. For illustrative purposes, only variable-speed circulation fan 102 is disclosed; however, in other embodiments, fixed speed and multi-speed circulation fans may be used as required. The variable-speed circulation fan 102, the gas heat 104, the electric heat 106, and the refrigerant evaporator coil 108 are collectively referred to as an "indoor unit" 110. In a typical embodiment, the indoor unit 110 is located within, or in close proximity to, an enclosed space 101. The HVAC system 102 also includes a variable-speed compressor 112, an associated condenser coil 114, and a condenser fan 113, which are typically referred to as an "outdoor unit" 116. In a typical embodiment, the condenser fan 113 may be at least one of a fixed-speed condenser fan, a multi-speed condenser fan, and a variable-speed condenser fan. In various embodiments, the outdoor unit 116 is, for example, a rooftop unit or a ground-level unit. The variable-speed compressor 112 and the associated condenser coil 114 are connected to an associated evaporator coil 108 by a refrigerant line 118. In a typical embodiment, the variable-speed compressor 112 is, for example, a single-stage compressor, a multi-stage compressor, a single-speed compressor, or a variable-speed compressor. The variable-speed circulation fan 102, sometimes referred to as an air blower, is configured to operate at different capacities (i.e., variable motor speeds) to circulate air through the HVAC system 100, whereby the circulated air is conditioned and supplied to the enclosed space 101. For illustrative purposes, only variable-speed compressor 112 is disclosed; however, in other embodiments, fixed speed and multi-stage compressors may be used as required.

Still referring to FIG. 1, the HVAC system 100 includes an HVAC controller 120 that is configured to control operation of the various components of the HVAC system 100 such as, for example, the variable-speed circulation fan 102, the gas heat 104, the electric heat 106, the variable-speed compressor 112, and the condenser fan 113. In some embodiments, the HVAC system 100 can be a zoned system. In such embodiments, the HVAC system 100 includes a zone controller 122, dampers 124, and a plurality of environment sensors 126. In a typical embodiment, the HVAC controller 120 cooperates with the zone controller 122 and the dampers 124 to regulate the environment of the enclosed space 101.

The HVAC controller 120 may be an integrated controller or a distributed controller that directs operation of the HVAC system 100. In a typical embodiment, the HVAC controller 120 includes an interface to receive, for example, thermostat calls, component health data, temperature setpoints, air blower control signals, environmental conditions, and operating mode status for various zones of the HVAC system 100. In a typical embodiment, the HVAC controller 120 also includes a processor and a memory to direct operation of the HVAC system 100 including, for example, a speed of the variable-speed circulation fan 102.

Still referring to FIG. 1, in some embodiments, the plurality of environment sensors 126 are associated with the HVAC controller 120 and also optionally associated with a user interface 128. In some embodiments, the user interface 128 provides additional functions such as, for example, operational, diagnostic, status message display, and a visual interface that allows at least one of an installer, a user, a support entity, and a service provider to perform actions with respect to the HVAC system 100. In some embodiments, the user interface 128 is, for example, a thermostat of the HVAC system 100. In other embodiments, the user interface 128 is associated with at least one sensor of the plurality of environment sensors 126 to determine the environmental condition information and communicate that information to the user. The user interface 128 may also include a display, buttons, a microphone, a speaker, or other components to communicate with the user. Additionally, the user interface 128 may include a processor and memory that is configured to receive user-determined parameters, and calculate operational parameters of the HVAC system 100 as disclosed herein.

In a typical embodiment, the HVAC system 100 is configured to communicate with a plurality of devices such as, for example, a monitoring device 130, a communication device 132, and the like. In a typical embodiment, the monitoring device 130 is not part of the HVAC system. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In a typical embodiment, the communication device 132 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 132 includes at least one processor, memory and a user interface, such as a display. One skilled in the art will also understand that the communication device 132 disclosed herein includes other components that are typically included in such devices including, for example, a power supply, a communications interface, and the like.

The zone controller 122 is configured to manage movement of conditioned air to designated zones of the enclosed space. Each of the designated zones include at least one conditioning or demand unit such as, for example, the gas heat 104 and at least one user interface 128 such as, for example, the thermostat. The zone-controlled HVAC system 100 allows the user to independently control the temperature in the designated zones. In a typical embodiment, the zone controller 122 operates electronic dampers 124 to control air flow to the zones of the enclosed space.

In some embodiments, a data bus 134, which in the illustrated embodiment is a serial bus, couples various components of the HVAC system 100 together such that data is communicated therebetween. In a typical embodiment, the data bus 134 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 134 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134 may include any number, type, or configuration of data buses 134, where appropriate. In particular embodiments, one or more data buses 134 (which may each include an address bus and a data bus) may couple the HVAC controller 120 to other components of the HVAC system 100. In other embodiments, connections between various components of the HVAC system 100 are wired. For example, conventional cable and contacts may be used to couple the HVAC controller 120 to the various components. In some embodiments, a wireless connection is employed to provide at least some of the connections between components of the HVAC system such as, for example, a connection between the HVAC controller 120 and the variable-speed circulation fan 102 or the plurality of environment sensors 126.

Leak detection systems for the detection and monitoring of refrigerants are well known. Typically, the leak detection systems include a gas refrigerant detector, a monitor, and relay system to alert individuals and remote monitoring stations that a problem exists relative to refrigerant leak. Presently, in an event of refrigerant leak in the HVAC system, the variable-speed circulation fan 102 continues to operate resulting in the refrigerant entering the enclosed space 101. Refrigerant leak resulting in the refrigerant entering the enclosed space 101 is a health hazard. Additionally, in the case of flammable refrigerants, refrigerant entering the enclosed space 101 is a substantial fire hazard. What is needed is a method of and system for detecting refrigerant leak and modifying operation of the HVAC system to prevent the refrigerant from entering the enclosed space 101 until repairs are completed. In an effort to monitor refrigerant leak within HVAC systems and prevent health and fire hazard situations, exemplary embodiments disclose placing a plurality of leak detectors at various components of the HVAC system 100. In a typical embodiment, a plurality of leak detectors may be placed around, for example, the variable-speed circulation fan 102. In the context of the present application, a leak detector is defined as a device that detects refrigerant leak.

The exemplary HVAC system 100 includes a plurality of leak detectors 127a, 127b that are positioned on various components of the HVAC system 100. In particular, the plurality of leak detectors 127a, 127b are positioned around the variable-speed circulation fan 102. For illustrative purposes, only two leak detectors 127(a), 127(b) are disclosed as being positioned around the variable-speed circulation fan 102; however, in alternative embodiments, additional leak detectors may be positioned on other components as dictated by design requirements. In a typical embodiment, the plurality of leak detectors 127a, 127b are configured to detect refrigerant leak within the HVAC system 100. In a typical embodiment, plurality of leak detectors 127a, 127b are electronic leak detectors such as, for example, corona discharge leak detectors, heated diode leak detectors, ultrasonic leak detectors, and the like.

In a typical embodiment, the plurality of leak detectors 127a, 127b are configured to communicate with the HVAC controller 120. In particular, upon refrigerant leak detection, the plurality of leak detectors 127a, 127b communicate a refrigerant leak warning signal to the HVAC controller 120. In some embodiments, the data bus 134 may couple the HVAC controller 120 to the plurality of leak detectors 127a, 127b. In other embodiments, connections between the HVAC controller 120 and the plurality of leak detectors 127a, 127b are wired. For example, conventional cable and contacts may be used to couple the HVAC controller 120 to the plurality of leak detectors 127a, 127b. In some embodiments, a wireless connection is employed to provide at least some of the connections between the HVAC controller 120 and the plurality of leak detectors 127a, 127b.

In a typical embodiment, during operation of the HVAC system 100, the plurality of leak detectors 127a, 127b are configured to continuously monitor the HVAC system 100 for refrigerant leak. Upon detection of the refrigerant leak, the plurality of leak detectors 127a, 127b communicate the refrigerant leak warning signal to the HVAC controller 120. Subsequently, the HVAC controller 120 modifies operation of various components of the HVAC system 100 to prevent the refrigerant from entering the enclosed space 101. In one embodiment, the HVAC controller 120 suspends operation of the variable-speed circulation fan 102 while activating an exhaust fan 121 to prevent refrigerant from entering the enclosed space 101. Additional details relative to the modified operation of the HVAC system 100 upon detection of the refrigerant leak will be discussed in detail below. In some embodiments, in addition to suspending operation of the variable-speed circulation fan 102, the HVAC controller 120 forwards the refrigerant leak warning signal to the monitoring device 130 to monitor a level of the refrigerant leak. In a typical embodiment, the monitoring device 130 is not part of the HVAC system. For example, the monitoring device 130 is a server or computer of the third party such as, for example, the manufacturer, the support entity, the service provider, and the like. In other embodiments, the monitoring device 130 is located at an office of, for example, the manufacturer, the support entity, the service provider, and the like.

Figure 2:
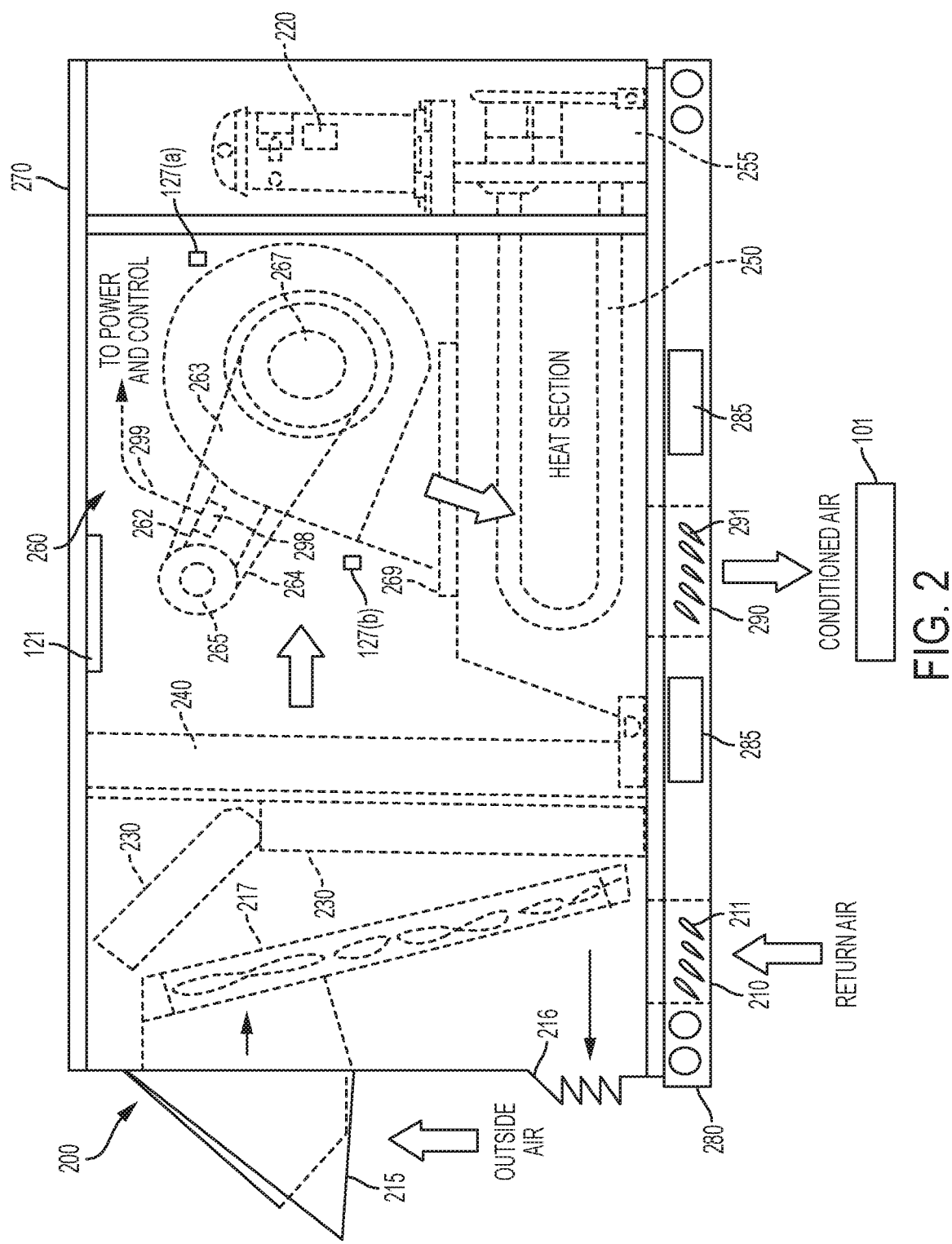
FIG. 2 is a side view of an illustrative HVAC system.

FIG. 2 is a side view of an illustrative HVAC system 200. For illustration, the HVAC system 200 as illustrated in FIG. 2 is a rooftop unit. For illustrative purposes, FIG. 2 will be described herein relative to FIG. 1. The HVAC system 200 includes a return air duct 210 having return air dampers 211, an outdoor air duct 215, economizer dampers 217, a compressor system 220, filters 230, an evaporator coil 240, a heat section 250, a gas supply 255, an air blower 260, and at least one exhaust fan 121. The HVAC system 200 also includes a housing 270, a base 280 with forklift slots 285, a supply air duct 290 having supply air dampers 291, and a plurality of leak detectors 127a, 127b that are positioned on various components of the HVAC system 200. In a typical embodiment, the plurality of leak detectors 127a, 127b are positioned around the air blower 260. The return air duct 210 and the supply air duct 290 are represented by dashed lines through the base 280 in this side view. The HVAC system 200 includes additional components that are not visible from this view due to various walls, compartments or equipment, but are typically included in conventional HVAC systems. For example, the HVAC system 200 also include a power supply, condenser coils and a condenser fan(s).

An air flow path through the HVAC system 200 is represented by the arrows. Air is received in the HVAC system 200 via the return duct 210 (i.e., return air) and/or the outside air duct 215 (i.e., outside air). The dampers 217 can be controlled to determine the air mixture. The received air (e.g., return, outside or a mixture thereof) is then pulled across the filters 230, the evaporator coil 240. The air blower 260 moves the air across the heat section 250 and discharges air to the enclosed space 101 via the supply air duct 290. The air discharged through the supply air duct 290 to the enclosed space 101 may be conditioned due to either a cooling mode or a heating mode of the HVAC system 200. Additionally, in some embodiments, the HVAC system 200 includes gravity air dampers 216 that allow for the passage of air from inside the enclosed space 101 to the outside to prevent overpressure inside the enclosed space 101. In other embodiments, motorized fans may be utilized to remove air from inside the enclosed space 101 to the outside.

The air blower 260 includes a motor 262, a scroll fan 263, and a belt 264. The belt 264 is coupled to the magnet motor 262 and the scroll fan 263 to rotate a fan shaft 267 via a motor shaft 265. The air blower 260 further includes an inverter 298 that is electrically coupled to the motor 262 and configured to operate the motor at variable speeds. The inverter 298 may also be mechanically coupled to the motor 262 or, alternatively, may be positioned in another location within the HVAC system 200. The inverter 298 is electrically coupled to the HVAC controller 120 and a power supply of the HVAC system 200 via the power and control wiring 299. The power and control wiring 299 may be connected to the inverter 298 via conventional means. In addition to providing variable-speed capability for the motor 262, the inverter 298 is also configured to soft start the motor 262 in order to prevent damage to the air blower 260.

The HVAC system 200 also includes a blower deck 269 in which the air blower 260 is mounted. The blower deck 269 is typically constructed to slide or roll to allow easier access to the air blower 260. The blower deck 269 is usually constructed of a metal sufficiently rigid to support the air blower 260. The blower deck 269 may be coupled to the base 280 for support. The blower deck 269 also includes an opening (not visible) that corresponds to the supply air duct 290 for discharging air.

In a typical embodiment, the plurality of leak detectors 127a, 127b are configured to communicate with the HVAC controller 120. In particular, the plurality of leak detectors 127a, 127b are configured to communicate a refrigerant leak warning signal to the HVAC controller 120. In a typical embodiment, during operation of the HVAC system 200, the plurality of leak detectors 127a, 127b are configured to continuously monitor HVAC system 200 for refrigerant leak. Upon detection of the refrigerant leak, the plurality of leak detectors 127a, 127b communicate the refrigerant leak warning signal to the HVAC controller 120. Subsequently, the HVAC controller 120 modifies operation of the various components of the HVAC system 200 to prevent the refrigerant from entering the enclosed space 101. In one embodiment, the HVAC controller 120 suspends operation of the air blower 260 while activating the exhaust fan 121 to dissipate the refrigerant outdoors. Additionally, the HVAC controller 120 regulates the economizer dampers 217 to be in an open configuration while regulating the return and supply air dampers 211, 291 to be in a closed configuration. Such a configuration of the economizer dampers 217 and the return and supply air dampers 211, 291 prevents the refrigerant from entering the enclosed space 101 while dissipating the refrigerant outdoors.

Figure 3:
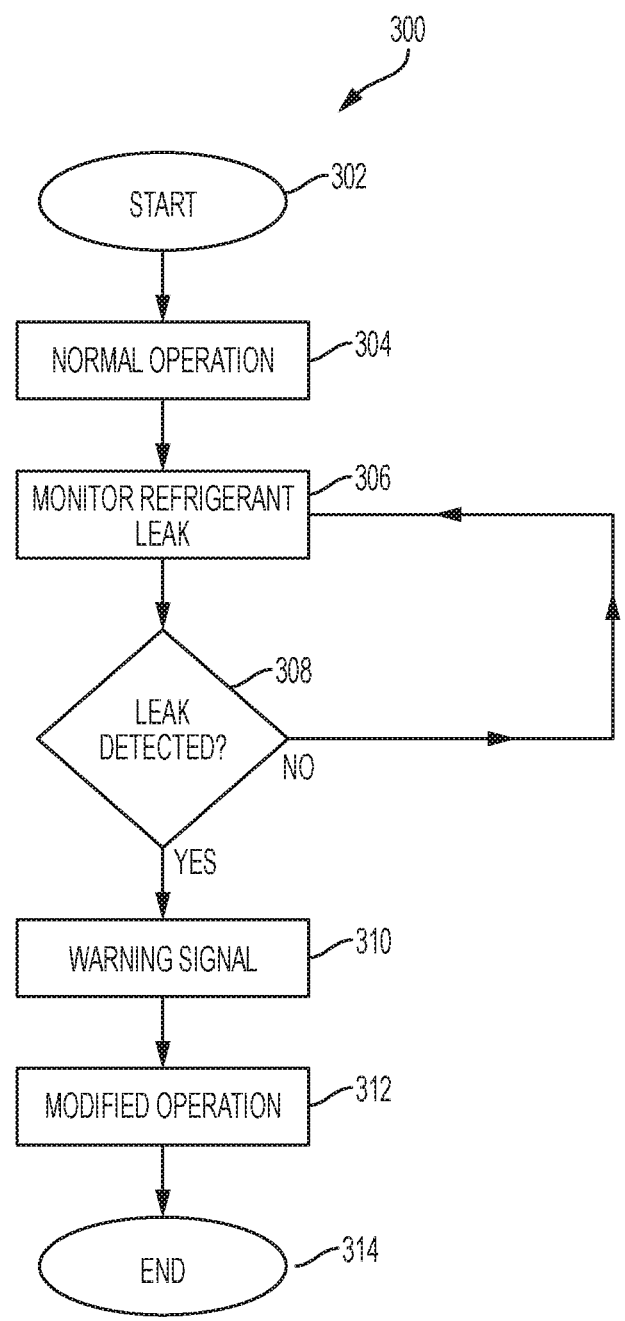
FIG. 3 is a flow diagram illustrating an illustrative process to monitor the HVAC system for refrigerant leak.

FIG. 3 is a flow diagram illustrating an illustrative process 300 to monitor the HVAC system 100, 200 for refrigerant leak. For illustrative purposes, the process 300 will be described herein relative to FIGS. 1-2. The process 300 starts at step 302. At step 304, the HVAC system 100, 200 performs normal operation to condition air via, for example, heating, cooling, humidifying, or dehumidifying. At step 306, it is determined whether refrigerant leak is detected. The plurality of leak detectors 127a, 127b continuously monitor the HVAC system 100, 200 for refrigerant leak. In a typical embodiment, plurality of leak detectors 127a, 127b are electronic leak detectors such as, for example, corona discharge leak detectors, heated diode leak detectors, ultrasonic leak detectors, and the like. If it is determined at step 308 that no refrigerant leak has been detected, the process 300 returns to step 306. However, if it is determined at step 308 that refrigerant leak is detected, the process 300 proceeds to step 310. At step 310, the plurality of leak detectors 127a, 127b communicate the refrigerant leak warning signal to the HVAC controller 120. Subsequently, at step 312, the HVAC controller 120 modifies operation of various components of the HVAC system 100, 200 to prevent the refrigerant from entering the enclosed space 101. In one embodiment, the HVAC controller 120 suspends operation of the air blower 260 while activating the exhaust fan 121 to dissipate the refrigerant outdoors. Additionally, the HVAC controller 120 regulates the economizer dampers 217 to be in an open configuration while regulating the return and supply air dampers 211, 291 to be in a closed configuration. Such a configuration of the economizer dampers 217 and the return and supply air dampers 211, 291 prevents the refrigerant from entering the enclosed space 101 while dissipating the refrigerant outdoors. At step 314, the process 300 ends.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor, one or more portions of the system memory, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of monitoring a heating, ventilation, and air conditioning (HVAC) system for refrigerant leak, the method comprising:

monitoring, by a controller, operation of the HVAC system;

determining, using a plurality of leak detectors, whether refrigerant within the HVAC system is leaking;

responsive to a positive determination in the determining step, receiving, by the controller, a refrigerant leak warning signal;

modifying, by the controller, operation of the HVAC system to prevent the refrigerant from entering an enclosed space;

wherein the modifying step consists of:
  suspending operation of an air blower;
  activating an exhaust fan to dissipate leaked refrigerant outdoors via an outlet of the exhaust fan;
  regulating economizer dampers disposed within an outdoor air duct of the HVAC system to be in an open configuration thereby acting as a temporary secondary outlet to dissipate the leaked refrigerant outdoors, wherein the economizer dampers are configured to determine a mixture of air for conditioning by the HVAC system by controlling an appropriate level of outside air to be pulled into the HVAC system; and
  regulating return air dampers disposed within a return air duct of the HVAC system and supply air dampers disposed within a supply air duct of the HVAC system to be in a closed configuration; and
  forwarding, by the controller, the refrigerant leak warning signal to a computer associated with a third party entity to monitor a level of the refrigerant leak, wherein the computer associated with the third party entity is located at a work site of the third party entity.

2. The method of claim 1 further comprising:
responsive to a negative determination in the determining step, returning to the determining step.

3. The method of claim 1, wherein the plurality of leak detectors are positioned around an air blower.

4. The method of claim 1, wherein the plurality of leak detectors comprises at least one of a corona discharge leak detector, a heated diode leak detectors, and an ultrasonic leak detectors.

5. The method of claim 1, wherein the controller is configured to communicate with the plurality of leak detectors wirelessly.

6. The method of claim 1, wherein the controller is configured to communicate with the plurality of leak detectors using a cable connection.

7. A heating, ventilation, and air conditioning (HVAC) system comprising:
  a plurality of leak detectors associated with at least one component of the HVAC system;
  a controller configured to communicate with the plurality of leak detectors;
  wherein the plurality of leak detectors are configured to:
    determine whether refrigerant within the HVAC system is leaking; and
    responsive to a positive determination, forward to the controller, a refrigerant leak warning signal;
  upon receiving the refrigerant leak warning signal, the controller modifies operation of the HVAC system to prevent the refrigerant from entering an enclosed space;
  wherein the modified operation of the HVAC system causes the controller to:
    suspend operation of an air blower;
    activate an exhaust fan to dissipate leaked refrigerant outdoors via an outlet of the exhaust fan;
    regulate economizer dampers disposed within an outdoor air duct of the HVAC system to be in an open configuration thereby acting as a temporary secondary outlet to dissipate the leaked refrigerant outdoors, wherein the economizer dampers are configured to determine a mixture of air for conditioning by the HVAC system by controlling an appropriate level of outside air to be pulled into the HVAC system;
    regulate return air dampers disposed within a return air duct of the HVAC system and supply air dampers disposed within a supply air duct of the HVAC system to be in a closed configuration; and
    forward the refrigerant leak warning signal to a computer associated with a third party entity to monitor a level of the refrigerant leak, wherein the computer associated with the third party entity is located at a work site of the third party entity.

8. The HVAC system of claim 7, wherein the plurality of leak detectors are positioned around the at least one component, wherein the at least one component comprises an air blower.

9. The HVAC system of claim 7, wherein the plurality of leak detectors comprises at least one of a corona discharge leak detector, a heated diode leak detectors, and an ultrasonic leak detectors.

10. The HVAC system of claim 7, wherein the controller is configured to communicate with the plurality of leak detectors wirelessly.

11. The HVAC system of claim 7, wherein the controller is configured to communicate with the plurality of leak detectors using a cable connection.

12. The HVAC system of claim 7, wherein the modified operation of the HVAC system prevents the refrigerant from entering the enclosed space.

13. The HVAC system of claim 7, wherein the modified operation of the HVAC system dissipates the refrigerant outdoors.

14. A method of monitoring a heating, ventilation, and air conditioning (HVAC) system for refrigerant leak, the method comprising:
  monitoring, by a controller, operation of the HVAC system;
  determining, using a plurality of leak detectors, whether refrigerant within the HVAC system is leaking;
  responsive to a positive determination in the determining step, receiving, by the controller, a refrigerant leak warning signal, wherein the controller is configured to communicate with the plurality of leak detectors wirelessly;
  modifying, by the controller, operation of the HVAC system to prevent the refrigerant from entering an enclosed space;
  wherein the modifying consists of:
    suspending operation of an air blower;
    activating an exhaust fan to dissipate leaked refrigerant outdoors via an outlet of the exhaust fan;
    regulating economizer dampers disposed within an outdoor air duct of the HVAC system to be in an open configuration thereby acting as a temporary secondary outlet to dissipate the leaked refrigerant outdoors, wherein the economizer dampers are configured to determine a mixture of air for conditioning by the HVAC system by controlling an appropriate level of outside air to be pulled into the HVAC system;

regulating return air dampers disposed within a return air duct of the HVAC system and supply air dampers disposed within a supply air duct of the HVAC system to be in a closed configuration; and forwarding, by the controller, the refrigerant leak warning signal to a computer associated with a third party entity to monitor a level of the refrigerant leak, wherein the computer associated with the third party entity is located at a work site of the third party entity.

15. The method of claim 14, wherein the plurality of leak detectors comprises at least one of a corona discharge leak detector, a heated diode leak detectors, and an ultrasonic leak detectors.

16. The method of claim 14, wherein the plurality of leak detectors are positioned around an air blower.

17. The method of claim 14, wherein the modified operation of the HVAC system prevents the refrigerant from entering the enclosed space.

\* \* \* \* \*